A. L. KITSELMAN.
BARB WIRE MAKING MACHINE.
APPLICATION FILED JUNE 11, 1904. RENEWED FEB. 21, 1908.

899,542.

Patented Sept. 29, 1908.
10 SHEETS—SHEET 1.

Alva L. Kitselman, Inventor,

Witnesses

A. L. KITSELMAN.
BARB WIRE MAKING MACHINE.
APPLICATION FILED JUNE 11, 1904. RENEWED FEB. 21, 1908.

899,542.

Patented Sept. 29, 1908.
10 SHEETS—SHEET 4.

Fig. 4.

Alva L. Kitselman, Inventor,

Witnesses

By

Attorney

A. L. KITSELMAN.
BARB WIRE MAKING MACHINE.
APPLICATION FILED JUNE 11, 1904. RENEWED FEB. 21, 1908.

899,542.

Patented Sept. 29, 1908.
10 SHEETS—SHEET 9.

Alva L. Kitselman, Inventor,

Witnesses
Howard D. Orr
Louis G. Julihn

UNITED STATES PATENT OFFICE.

ALVA L. KITSELMAN, OF MUNCIE, INDIANA.

BARB-WIRE-MAKING MACHINE.

No. 899,542.   Specification of Letters Patent.   Patented Sept. 29, 1908.

Application filed June 11, 1904, Serial No. 212,197. Renewed February 21, 1908. Serial No. 417,083.

*To all whom it may concern:*

Be it known that I, ALVA L. KITSELMAN, a citizen of the United States, residing at Muncie, in the county of Delaware and State of Indiana, have invented a new and useful Barb-Wire-Making Machine, of which the following is a specification.

This invention relates to a machine for making barbed wire, the primary object being to combine in a machine of this character comparatively simple, positively operating, and highly efficient instrumentalities, whereby the wire may be continuously drawn from a suitable source of supply and equipped in transit with suitable barbs.

A further object of the invention is to assemble in a single rotary structure several groups of barb forming and applying mechanisms traveling with the wire and operating in transit to feed the ends of barb forming wires to the strand wire; to wind or twist said ends around the strand wire and finally to sever the barb thus formed from the barb forming wire, the several operations performed by the several groups of mechanisms being so timed that each group after each complete cycle of movement will be restored to its initial condition or position for a repetition of the operation at another point of the strand wire without necessity for interrupting the movement or forward feed of the latter.

Another object of the invention is to improve the construction of the several barb twisters or twisting mechanisms and to provide a single means common thereto for operating them in the proper order.

Another object is to equip the machine with novel feeding mechanism for the barb forming wires, and with improved cutting devices for severing the barbs and including provision whereby the cut may be effected in any desired angle in accordance with the length of point required.

A further object is to simplify the operating mechanism for the barb forming and applying devices by equipping the latter with means coöperating with fixed members, as for instance, cams and gears carried by a fixed axial support around which the several groups of mechanisms travel in coöperative relation with the operating elements.

A still further object is to so organize the barb twisters and their complementary mechanisms that the latter may, if desired, be employed in duplicate, that is to say, a plurality of feeding and cutting mechanisms may be associated with each twister so that at each operation of the latter it will apply a double or four point barb to the wire.

A still further object of the invention is to associate a plurality of these rotating groups of mechanisms, whether of single or double form, in a manner to effect the application of single or double barbs to a plurality of strand wires, which may be subsequently intertwisted to form barbed wire.

Still another object of the invention is to associate a plurality of these rotating groups of barb forming and applying devices of either single or double form in a manner to effect thereby the application of barbs to the same wire arranged to be drawn forward and, if desired, to effect the operation of the barb forming and applying mechanisms.

Subordinate to the several objects stated are others which will appear during the course of the succeeding description of the illustrated embodiments of my invention.

In the accompanying drawings Fig. 4 is a section on the line 4—4 of Fig. 2.

1 indicates a suitable frame structure upon which is mounted the usual wire twisting and reeling device 2 operated through suitable interposed mechanism from a driving shaft 3 equipped with fixed and loose pulleys for the application of a belt, as shown. At the rear end of the frame 1 is located an extension including a pair of side frames 4 and 5 equipped with upper and lower clamps 6 and 7 for the retention of a pair of horizontal fixed shafts 8 and 9 upon which are rotatably mounted a pair of barbing drums 10 and 11, operatively connected for rotation in unison by a pair of gears 12 and 13, as clearly shown in Fig. 1.

While any suitable mechanism for operating the drums 10 and 11 may be employed, they are preferably driven by a counter-shaft 14 geared to the shaft 3 and equipped at its rear end with a beveled pinion 15 meshed with a comparatively large beveled gear 16 fixed to the upper drum 10 and preferably formed integral with the large spur gear 12 thereof.

The described form of operating mechanism for the drums is preferable, particularly where, as in the present instance, it is necessary to secure a proper ratio of speed between the drums and the wire reeling and twisting device 2. The exact arrangement shown is not essential, and in fact, when the twisting and reeling device is not employed, a very wide range of variation in the drum operating mechanism is permitted.

The strand wires $a$ and $b$ are led from any suitable source of supply, preferably at the front of the machine, and are carried around the drums in opposite directions and thence led from the proximate sides of said drums to the twisting and reeling device 2. In accordance with the invention it is desired to equip each of the drums with a plurality of groups of mechanisms, each of which contributes to the application of barbs to the strand wires, and all operating in a manner to effect the continuous application of the barbs to the strand wires, as the latter move without interruption to the mechanism which twists the strands together and reels the finished product.

As the two drums 10 and 11 are identical in construction, except that as they rotate in opposite directions certain reversals of position must be effected, I will proceed to describe in detail the upper drum 10 and its complementary devices, from which description the construction and operation of both drums will be clearly apparent.

Figure 1:
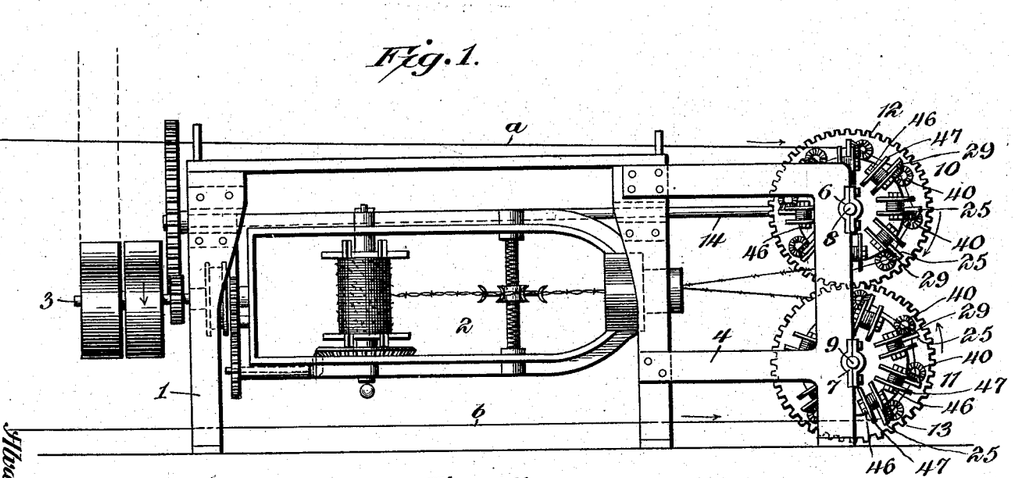
—Figure 1 is a side elevation of the complete machine.
Figure 2:
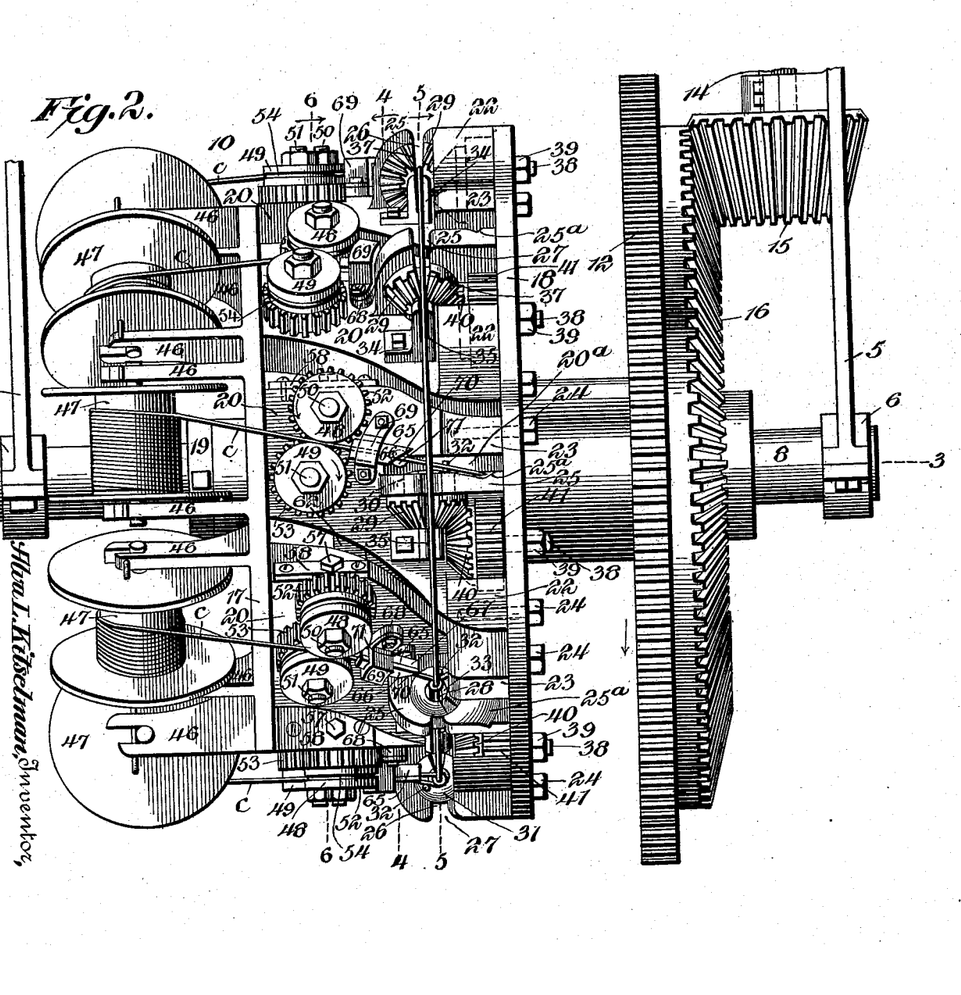
Fig. 2 is a plan view of one of the drums with its associated operating mechanism.
Figure 3:
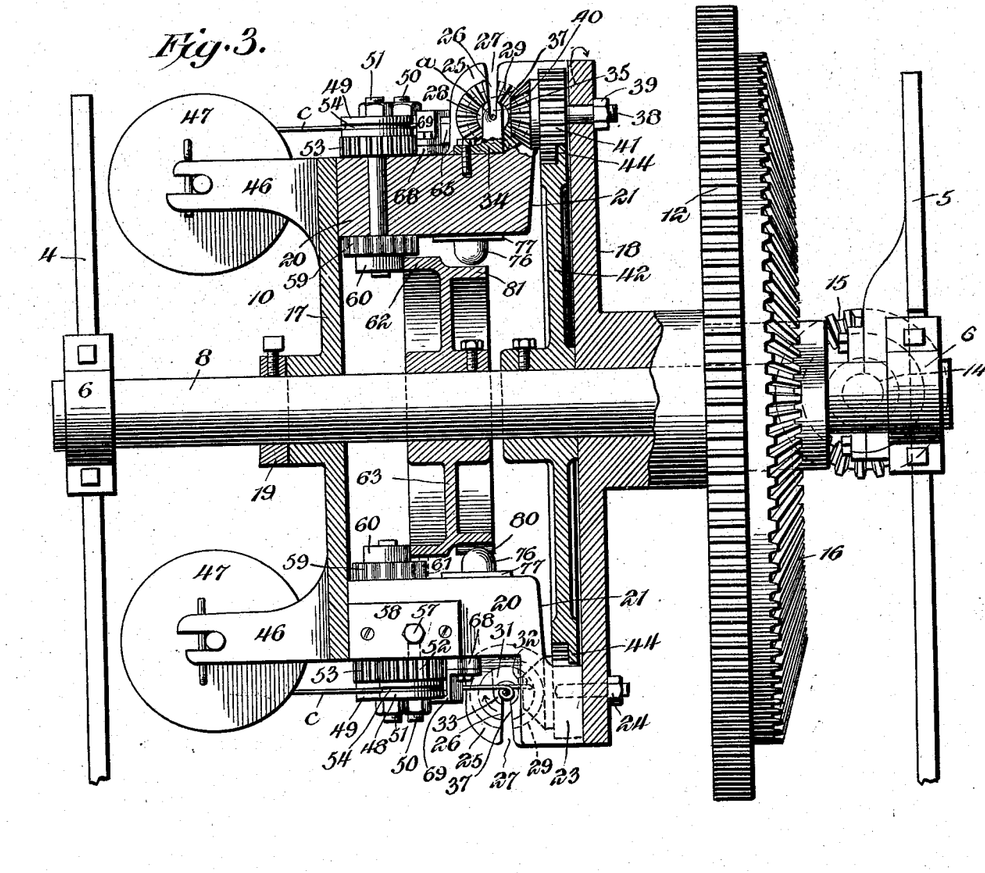
Fig. 3 is a section on the line 3—3 of Fig. 2.
Figure 5:
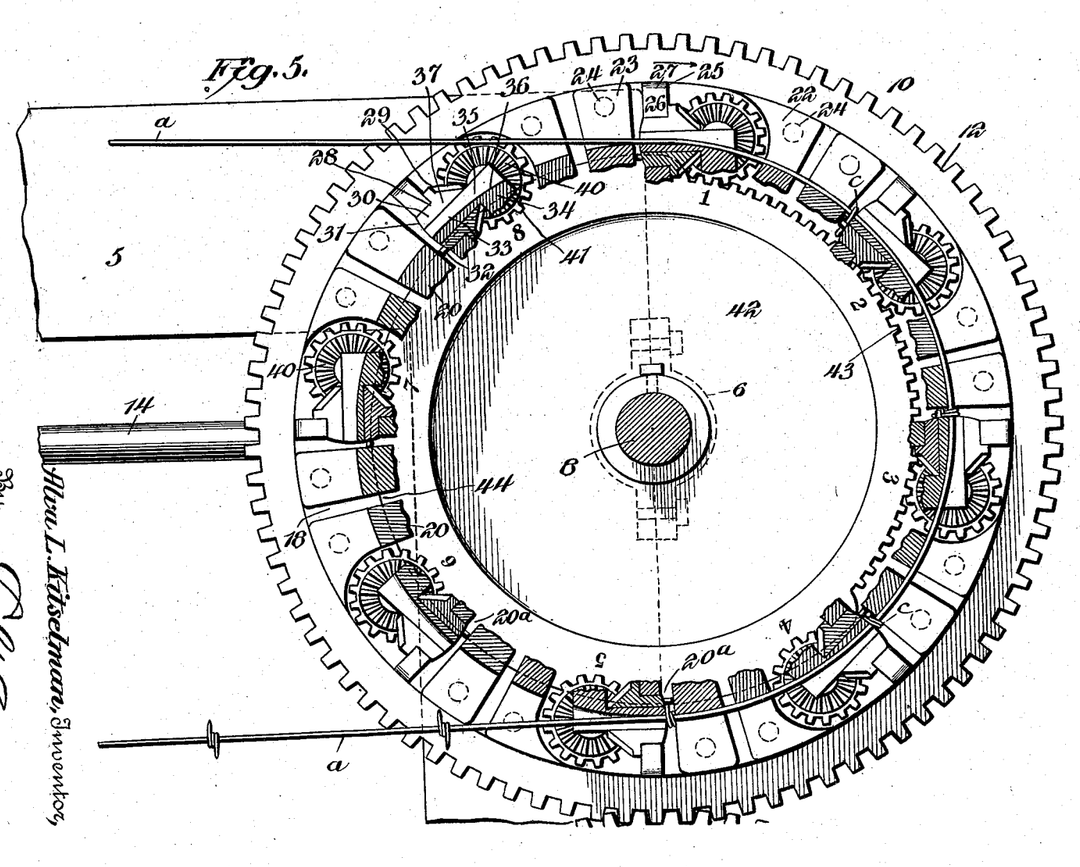
Fig. 5 is a section on the line 5—5 of Fig. 2.

The drum 10 comprises in its organization a pair of parallel disks or side plates 17 and 18 provided with hubs to one of which the gear-wheel 12 is fixed, as shown clearly in Fig. 3. These plates or disks are retained against movement endwise of the shaft 8 by a collar 19. The diameter of the disk 18 is somewhat greater than that of the disk 17 and the two disks are connected by a circumferential series of blocks 20 each of which supports a group of barb forming and applying devices. Each of these blocks extends horizontally from the plate 17 with its outer face substantially flush with the periphery thereof and with one end 21 terminating in spaced relation to the disk 18 to which it is connected by a pair of bolt lugs 22 and 23 rising from the outer side of the block, and receiving bolts 24 passed through the disk 18, as shown in Fig. 2. The blocks 20 are somewhat irregular in form, as shown in Fig. 2, and are spaced apart around the drum to constitute a series of supports for a series of independent groups of barb feeding, forming and applying mechanisms. The strand wire $a$ passes around one side of the drum, as shown in Figs. 1, 2 and 5, and for its accommodation the several blocks are provided with radially disposed strand wire guides 25, preferably in the form of lugs, integral with the blocks and extending substantially half way across the drum from the side plate or disk 18, see Fig. 3. The several guide lugs 25 are provided with alined slots or openings 26 having flared mouths 27 facilitating the reception of the strand wire within the guides as the drum is rotated.

*The twisters.*—Within each lug 25 is journaled a rotary twister 28 comprising a beveled pinion 29 from which extends a hub 30 journaled in the bearing lug 25 and having a convex end face 31 from which extends at an eccentric point the barb winding or twisting pin 32, see Fig. 5. Each twister 28 is equipped with a fixed axial guide 33 extended through the twister at the axis thereof and provided at a point in advance of the twister with a supporting foot 34 bolted or otherwise rigidly secured to the block 20. The fixed guide 33 constitutes in effect a journal for the twister, but its primary function is that of a fixed guide or eye through which the strand wire passes and by which the strand wire is protected from contact with the twister, or any other moving part, when the twister is rotated to wind the barb around the strand.

For the accommodation of the strand wire the axial guide 33 is provided with a radial slot 35 opening outwardly in line with the guide slot 26 in the lug 25 and having a longitudinally arcuate bottom wall 36 struck from the center of the drum as an axis. The twister 28 is likewise provided with a radial slot or opening 37 which, in the normal or strand wire receiving position of the twister, is alined with the slots 26 and 35 in the block 25 and axial guide 33 respectively. It will thus be seen that as the drum rotates in the direction of the arrow in Fig. 5, the twister mechanism will move up toward the horizontal upper run of the strand wire $a$ and will cause the latter to enter the flared mouth 27 of the guide slot and to pass thence to an axial position within the axial guide 30 of the twister. This will present the parts in the first position indicated in Fig. 5 with the strand wire $a$ disposed above the end of a barb forming wire $c$ previously fed forward in a manner and by means of instrumentalities to be described.

As will be seen by reference to the twister in the first position in Fig. 5, and to the corresponding twister in Fig. 2, the end of the barb forming wire is located in a plane intermediate of the pin 32 and the strand wire, and it is obvious, therefore, that if the twister is rotated in the proper direction the pin traveling around the strand wire will cause the end of the barb forming wire to be twisted around the strand a number of times corresponding to the revolutions of twister.

*The twister operating mechanism.*—Extending through the side disk or plate 18 of the drum at proper points, are a plurality of stud shafts 38 retained by nuts 39 and each carrying a beveled pinion 40, meshing with a twister pinion 29, and a spur pinion 41 fixed to and preferably integral with the beveled pinion 40 and disposed to mesh with a comparatively large mutilated gear 42 fixed upon the shaft 8 and having its periphery extended between the ends 21 of the several blocks 20 and the adjacent side disk 18 of the drum. The gear 42 is designed to coöperate with each pinion 41 in a manner to cause each twister to receive one or more complete rotations during a predetermined arc of its travel around the axis of the drum, and to be held stationary with the parts in their initial positions during the remainder of the cycle. The gear 42 is, therefore, formed with a toothed segment or rack 43 and with a somewhat longer locking flange 44 extending between the ends of the segment 43 at the opposite side of the gear. The locking flange 44 of the gear 42 is comparatively narrow, as shown in Fig. 3, and is located at one side of the gear for coöperation with a locking cam 45 formed on the spur pinion 41 preferably by cutting away the periphery of the latter at one side edge of the pinion so that, while the continuity of the series of teeth is maintained for effective coöperation with the rack 43, provision will be made for such engagement between the cam 45 and the flange 44, that after the twister has been rotated to apply a barb to the strand, said twister will remain stationary as regards its individual movement, until it again arrives in the first position and is called into action to apply another barb to the strand. This description will be clearly comprehended by examination of Figs. 2, 5 and 9. In Fig. 5 the spur pinion of the twister located in the first position has just engaged the upper end of the rack or segment 43 and in Fig. 9, which is a view looking from the opposite side of the pinion, it will be seen that the locking cam 45 has just swung down over the end of the locking flange so that, the cam and flange having moved out of coöperative relation, the pinion may rotate as it travels along the segmental rack for the purpose of operating the twister in the manner described. When the pinion reaches the end of the segment the locking cam 45 is in position to engage the flange, and slides along the latter to prevent the rotation of the twister and thus insure the proper alinement of the racial opening therein with the strand wire receiving guide in the lug 25.

*The feeding mechanism for the barb-forming wires.*—From the outer side of the disk or plate 17 extends a plurality of spool supporting arms 46 carrying a series of barb forming wire spools 47 from each of which a barb forming wire is fed to a twister, see Fig. 2. The barb forming wire c is advanced during the interval which elapses between the completion of a barb and the arrival of the twister in position to again receive the strand wire. Therefore, with each of the several twisters is associated wire feeding mechanism, preferably in the form of a pair of feed-rolls 48 and 49 mounted at the outer ends of spindles 50 and 51, journaled in the block 20 and geared together by pinions 52 and 53 compelling the operation of the feed-rolls in unison.

The rolls 48 and 49 are formed with coincident peripheral grooves 54 for the reception of the wire, and in order to accommodate wire of any desired gage the feed-rolls are relatively adjustable. This adjustment is preferably secured by mounting the spindle 50 of the roll 48 in the adjustable bearing block 55 slidably mounted in the recess 56 in the block 20 and arranged to be moved by an adjusting screw 57 having threaded connection with the block 55 and having its outer end rotatably held by a plate 58 secured to the side face of the block 20 and closing the recess 56. When it is desired to adjust the feed-rolls toward or from each other it is merely necessary to turn the bolt 57 in the proper direction thus shifting the bearing block 55 and moving the spindle 50 laterally until the rolls properly grip the barb forming wire.

The feed-rolls, like the twisters, are designed to be operated by the movement of the drum around its axis, and, like the twisters also, it is necessary to lock the feeding mechanism against further movement after the barb forming wire has been fed forward and until it is again necessary to inaugurate the feed for the purpose of supplying material for another barb. To attain this end I mount upon the inner end of the shaft 51 a star wheel 59 located immediately below the under face of the block 20 and associated with a locking cam 60, preferably of rectangular form, likewise fixed to the shaft 51.

Figure 6:
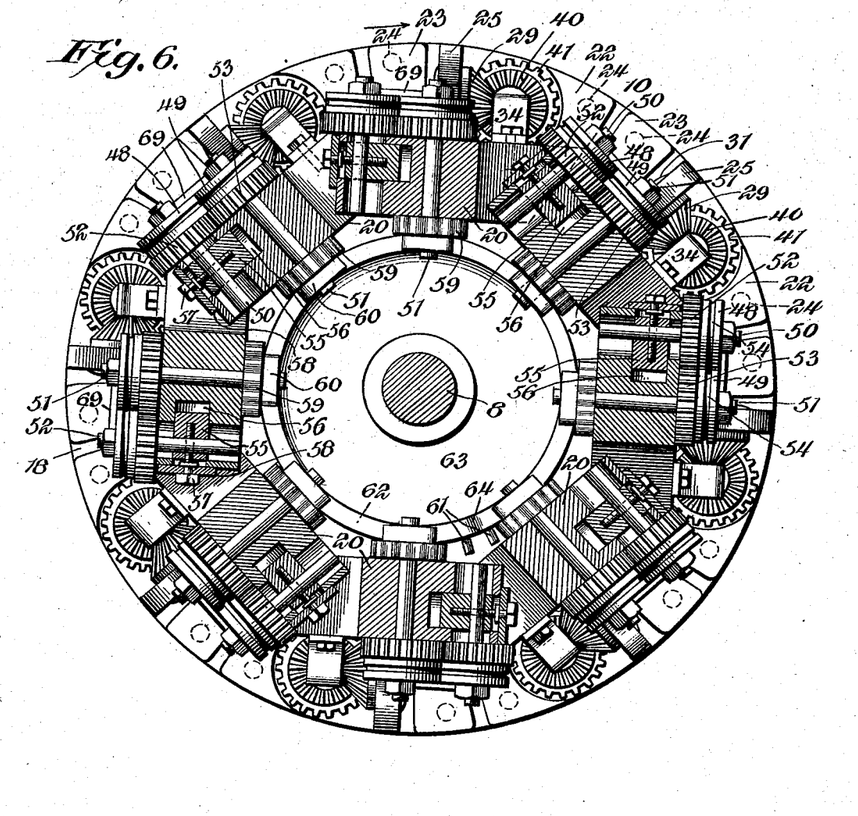
Fig. 6 is a section on the line 6—6 of Fig. 2 with certain of the parts left in elevation.

At a predetermined point in the rotation of the drum the star wheel 59 is brought into mesh with a pair of pins or tappets 61 extending radially from the annular locking flange 62 of a fixed cam element 63 mounted on the shaft 8 within the drum, as clearly shown in Figs. 3 and 6. When this meshing relation between the pins and the star wheel has been effected, continued rotation of the drum will obviously effect a predetermined rotary movement of the wheel 59 for the purpose of operating the feed rolls to feed the barb forming wire c a predetermined distance.

The flange 62 is provided in that face thereof opposed to the rectangular locking cam 60, with a notch 64 located midway of the pins and designed to afford sufficient clearance for a corner of the cam to permit the requisite rotary movement of the spindle 51. When, however, a quarter turn of the spindle has been completed the star wheel 59 will move out of engagement with the pins and a flat side face of the cam 60 will be disposed opposite the face of the locking flange 62 to lock the feed rolls against further movement until they are again brought to the feeding position by the rotation of the drum.

*The barb - severing mechanism.*—It is of course necessary to provide some means between the feed rolls and the twisters for properly guiding the advancing ends of the barb forming wires and for severing the barb when the latter shall have been properly affixed to the strand wire. I therefore interpose between each twister and its associated feed rolls, a sectional wire guide 65 comprising upper and lower grooved plates 66 and 67, mounted on a block 68 and adjustably retained by the clamp yoke 69, as clearly shown in Fig. 4. The adjustable mounting of the guide 65 is designed to insure the delivery of the barb forming wire c in proper relation to the strand wire and twister, it being observed that while the feed of the wire c is transverse to the strand, it bears a slight angular relation in order that the advanced extremity of the wire c may be carried around the strand wire by the twister without coming in contact with that portion of the wire c adjacent to the guide. This relation of the wires is further facilitated by forming the guide lug 25 with a notch 25ᵃ in its side face (see Fig. 2) so that that portion of the wire which is engaged by the pin 32 will lie reasonably close to the end of the twister.

In order to provide sufficient clearance for the barb as the latter is carried around the strand wire, the outer face of the block 20 is formed with a recess 20ᵃ, as shown in Fig. 2, and as heretofore stated, the extremity of the twister hub is slightly convex in order that, as the end of the wire c is carried around by the operation of the twister, it will be forced back slightly in order to produce a tight coil.

Assuming that a barb forming wire has been advanced to the position shown at the center of Fig. 2 and that during the subsequent advance of the drum the end of the wire has been coiled around the strand to form a barb, it is apparent that the barb must be severed. For this purpose the guide 65, the upper member 66 of which constitutes an element of the cutting mechanism, is beveled as indicated at 70 and opposed to this beveled face is a cutter bar 71 of cylindrical form but provided at its upper end with a flat side 72 fitting closely against the beveled face 70 of the guide. This cutter bar 71 is mounted in the block 20 for both rotary and endwise movement, its lower end 73 being threaded and screwed into a cylindrical bar holder 74, mounted in a cylindrical opening 75 in the block 20 and provided with a tappet 76, extended downwardly from a plate 77 secured to the under side of the block 20 to limit the depression of the holder.

The tappet 76 is of transversely angular form the opening in the plate 77 being of corresponding contour for the purpose of preventing the rotation of the holder 74. The upper or outer end of the tappet bar holder is provided with a spring seat 78 between the bottom wall of which and the top wall of the opening 75 is interposed a cutter bar retractile spring 79 encircling the bar and normally retaining the latter in the depressed position, shown in Fig. 4, with the tappet 76 located in a path obstructed by a cutter operating cam 80, having the form of a projection extending outwardly from a flange 81 of the fixed cam member 63, see Fig. 4.

In practice, the wire guide 65 is adjusted so as to dispose the beveled face 70 thereof at the desired angle at which it is required to sever the barb. That is to say, it is contemplated to sever the barb at an angle in order to produce a barb having sharp beveled ends, the extent of the bevel, and thus the length of the barb point, being determined by the adjustment of the guide. When the guide 65 is thus adjusted the corresponding adjustment of the cutter bar will be automatically effected since the latter will turn in the holder by reason of the engagement of the flat faces 70 and 72 of the guide and cutter bar respectively.

In order to prevent the extremity of the wire c from catching upon the upper end of the cutter bar during the feeding or twisting of the barb, the upper end of the bar is cut away or beveled as indicated at 82. It will now be seen by reference to Fig. 4 that, while the cutter bar is normally depressed below the barb forming wire c, the rotation of the drum, having first operated the wire feeding and barb forming mechanisms in the manner heretofore described, will finally bring the tappet 76 in contact with the cutter operating cam 80, so that continued rotation of the drum will cause the cutter bar to be forced outward against the resistance of its retracting spring 79, to sever the barb by the cooperation of the upper end of the cutter bar and the adjacent extremity of the upper member 66 of the wire guide.

Briefly, the operation of the described mechanism is as follows: As the continuous rotation of the drum carries a given group of mechanism, comprising barb feeding, twisting and cutting devices, to the first position indicated in Fig. 5, the strand wire $a$ will pass through the open mouth 27 of a guide 25, thence through the axial opening 37 of the rotary twister and will finally be received within the stationary axial guide 33. As the rotation of the drum continues, the locking cam 45 of the twister operating pinion will leave the locking flange 44, and the pinion 41, meshing with the segment 43 and traveling along the same, will cause the twister to make two complete rotations, the barb twisting or winding pin 32 engaging the extended end of the wire $c$ and carrying it twice around the strand wire $a$ during this movement. The specified group of mechanism will now have reached the end of the segment 43 and as the pinion 41 moves out of mesh therewith, the locking cam 45 of said pinion will move into engagement with the locking flange 44 so that, during the remainder of the travel of the twister to the first position, it will be retained against individual rotary movement and its radial opening 37 thus held in alinement with the openings in the guides 25 and 33 to again permit the reception of the strand wire at the proper time. After the twister has performed its function of twisting the barb and has been locked in the manner described, continued rotation of the drum will advance the tappet 76 of the associated cutter toward the cutter operating cam 80 with which it is brought in contact just before the twister reaches the fifth position in Fig. 5, which is at a point of the drum diametrically opposite the first position. Therefore, either immediately before or just as the twister moves away from the horizontal run of the strand wire, the cutter bar is urged outward to sever the barb from the barb forming wire, so that the rotation of the drum may effect the withdrawal of the twister from the strand wire, leaving attached to the latter the barb applied thereto. As soon as the tappet progresses beyond the cutter operating cam 80, the group of mechanism will continue its travel and when in approximately the fifth position shown in Fig. 5, the feeder operating, or star wheel, 59, will mesh with the pins 61 and will be rotated by the movement of the drum to operate the feed rolls 48 and 49 and thus advance a barb forming wire $c$ to the position shown at the center of Fig. 2, the extremity of the wire being disposed above the twister pin 32. As soon as the feed is effected the locking cam 60 will engage the flange 62 to lock the wire feeding mechanism against further movement and as the drum continues to rotate the twister will again reach its initial position, to-wit the first position in Fig. 5, with the strand wire overlying the barb forming wire and with all of the parts in position to repeat the described operation of forming, applying and severing a barb as this particular group of devices completes another cycle around the axis of the drum.

When, as in the present embodiment of the invention, it is desired to produce a barbed wire by intertwisting a pair of strand wires, two drums constructed as described except as to a reversal of the parts, are geared together, as heretofore explained, and as shown in Fig. 1, the several groups of mechanisms carried by the drums having an alternating arrangement so that the barbs of the strand wires will alternate when the barbed wire has been completed by the intertwisting of the strands.

Figure 8:
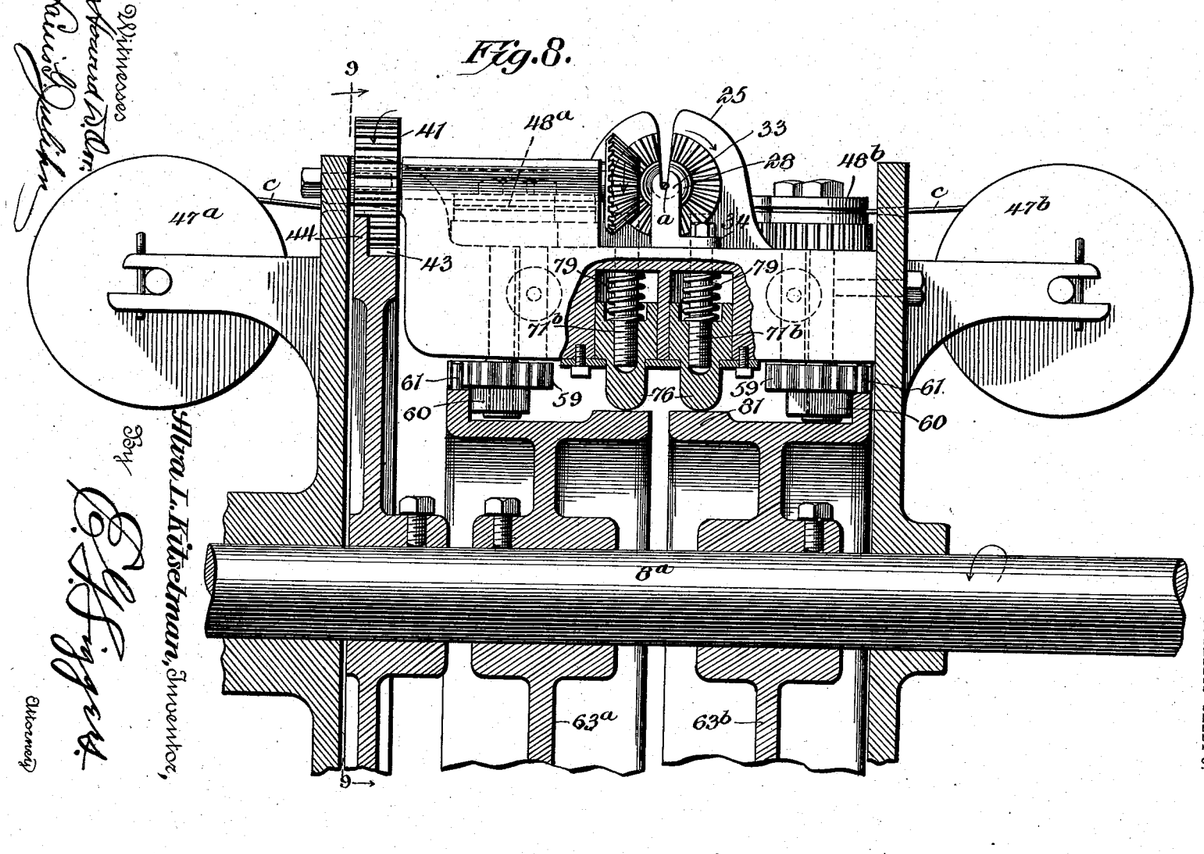
Fig. 8 is a vertical section of the subject-matter shown in Fig. 7.
Figure 9:
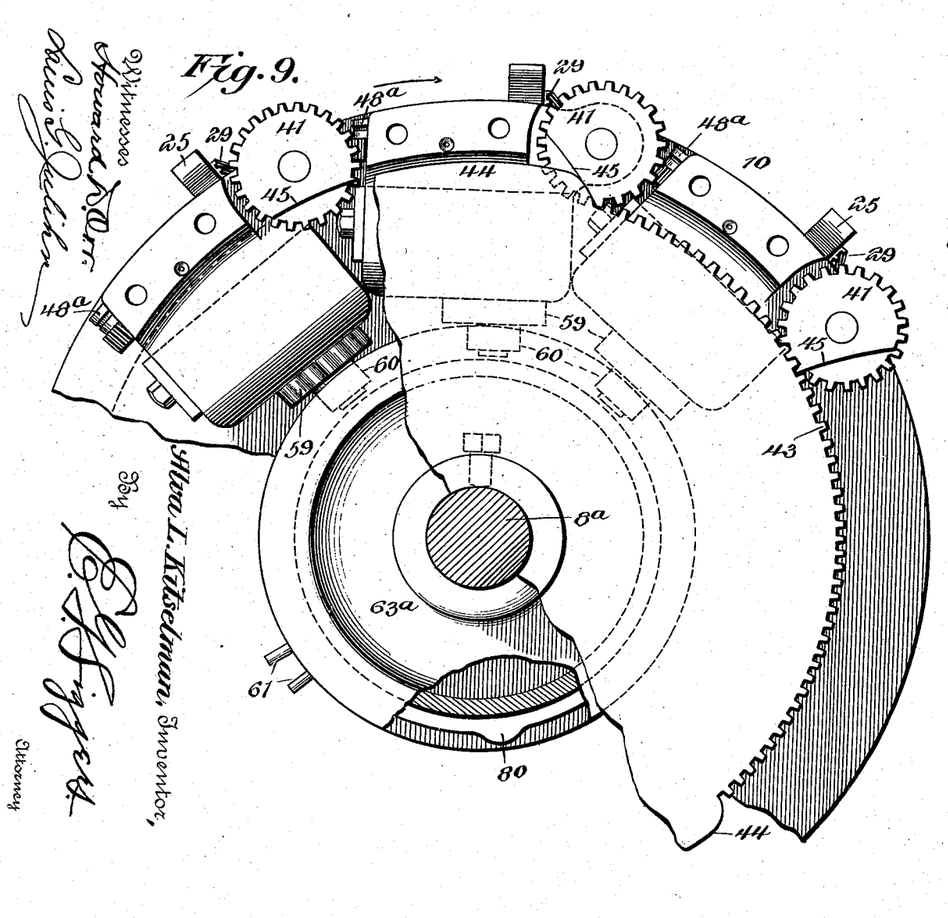
Fig. 9 is a sectional elevation on the line 9—9 of Fig. 8.
Figure 10:
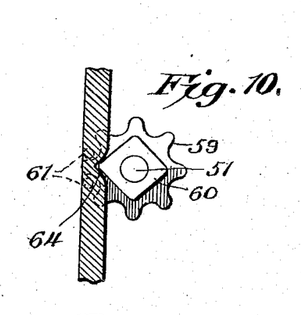
Figs. 10 and 11 are detail views of the feed-roll operating and locking devices, shown in different positions.
Figure 11:
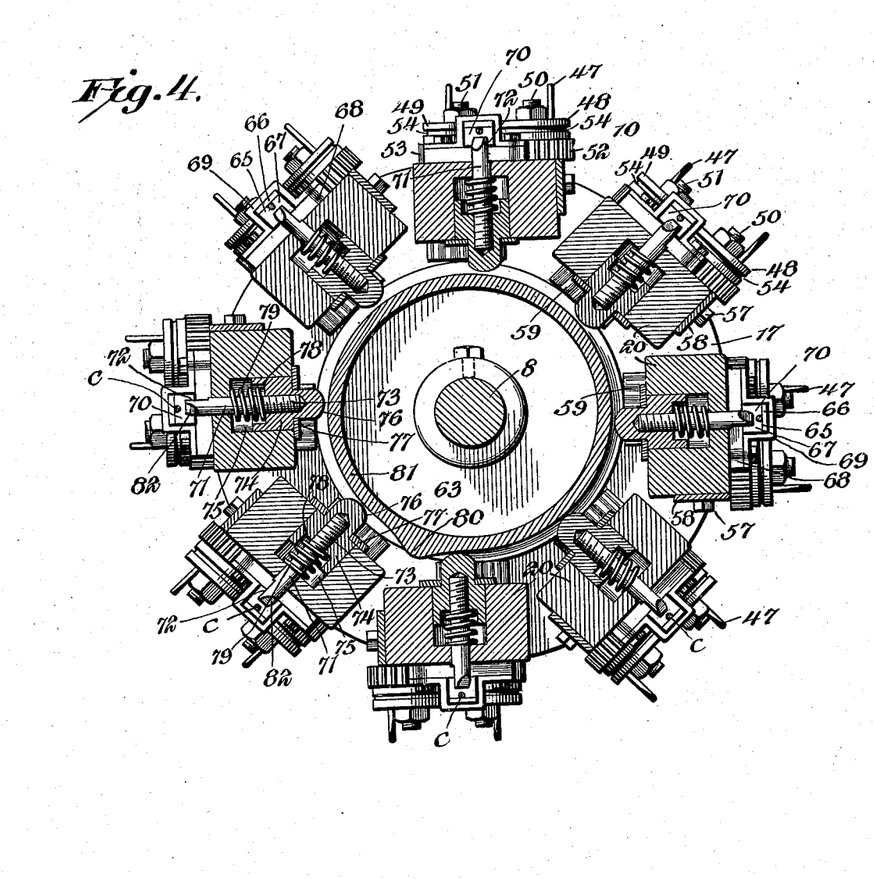

*The arrangement for forming double barbs.*— While the construction and arrangement heretofore described constitute a complete embodiment of my invention in one aspect thereof, it is contemplated to equip one or both drums in a manner to produce double or four point barbs. This end is attained by duplicating certain of the machine elements, as shown in Figs. 7 to 9 inclusive.

Figure 7:
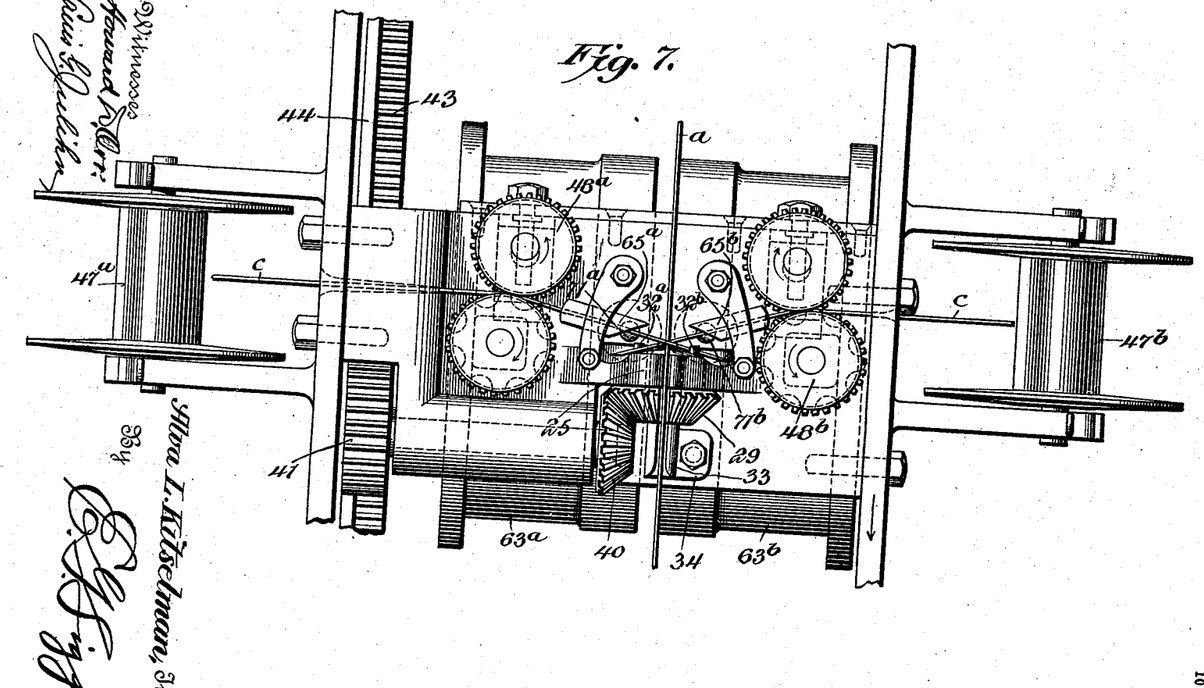
Fig. 7 is a plan view of one section of one drum designed to illustrate the arrangement employed for forming double barbs.

Aside from mere matters of proportion, the construction of the drum for forming four point barbs is precisely the same as that heretofore described for forming two point barbs, except that spools $47^a$ and $47^b$ are mounted at both sides of the drum for the barb forming wires extending into coöperative relation with a pair of pins $32^a$ and $32^b$ located at diametrically opposite points on the twister, as shown in Fig. 7, the feed of these wires being effected by duplicate feeding mechanisms $48^a$ and $48^b$ between which and the twister are interposed guides $65^a$ and $65^b$ coöperating with cutter bars $71^a$ and $71^b$, all as shown in Fig. 7. For operating these duplicate sets of feeding and cutting devices the shaft $8^a$ of this double machine is equipped with duplicate cam members $63^a$ and $63^b$ each of which is equipped with tappet pins for operating the star wheels of the feeders, locking flanges coöperating with the locking cams of the feeders, and cutter operating cams coöperating with the tappets of the cutters, all in a manner which will be perfectly clear from the description of the single form of machine. In fine, each group of barb forming, applying and cutting mechanism in the double form of the machine is the same as a corresponding group in the single form of machine except that the spools, feed devices, cutters and their coöperating, actuating and locking means are duplicated, and except further, that a single twister is provided with a plurality of barb twisting pins arranged to simultaneously intertwist a pair of barbs with each other and around the strand wire.

*The arrangement for utilizing a pair of drums for the application of barbs to a single-*

Figure 12:
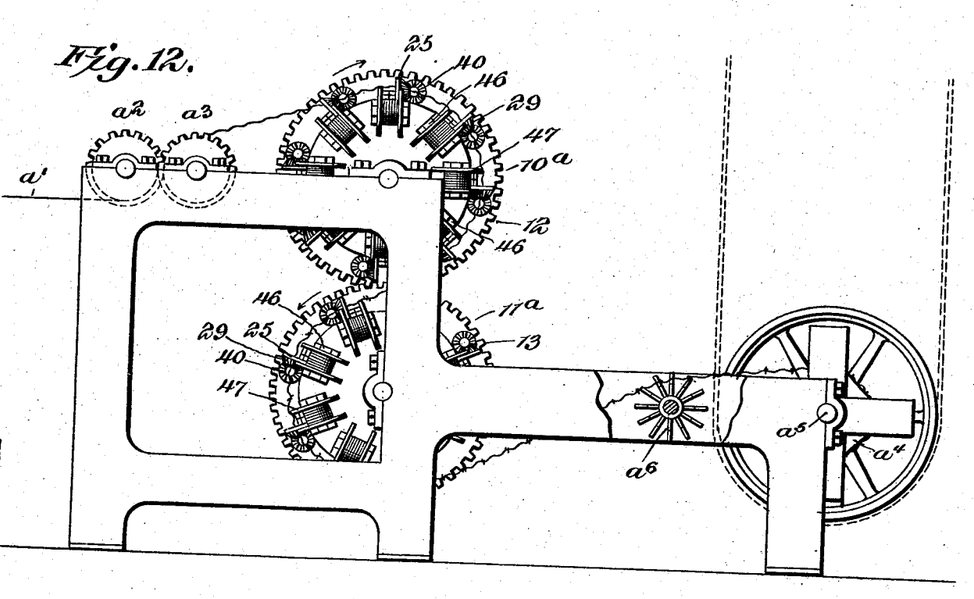
Fig. 12 is a side elevation of a modified form of the machine wherein the mechanisms carried by two drums operate to apply barbs to the same wire.
Figure 13:
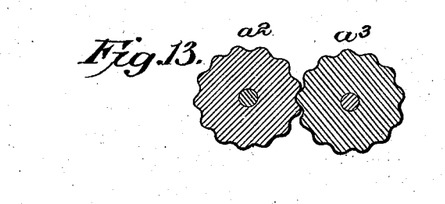
Fig. 13 is a detail sectional view of the crimping rolls.
Figures 14, 15:
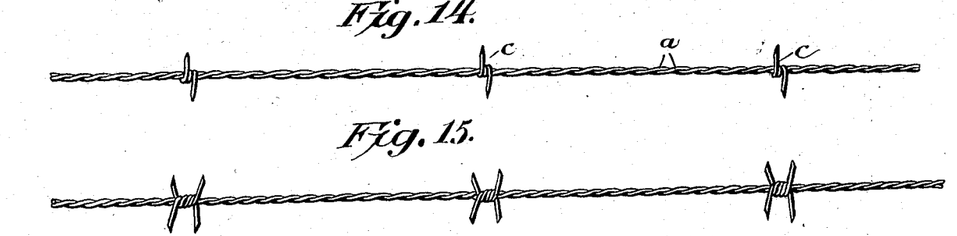
Figs. 14 and 15 are detail views of single and double barb wires.

*strand wire.*—In Fig. 12 is shown a further variation of the invention which is capable of being effected without departing from the principle underlying the operation of the mechanism first described. In this case a pair of barb forming and applying drums 10$^a$ and 11$^a$ are arranged one above the other in a suitable frame and are geared together just as are the drums shown in Fig. 1. The drum operating mechanism is omitted, however, and instead a strand wire $a'$ is first passed between a pair of crimping rolls $a^2$ and $a^3$ and is then led around opposite sides of the drums 10$^a$ and 11$^a$ and to a reel $a^4$ on the shaft $a^5$, to which the power is applied. As the drums 10$^a$ and 11$^a$ rotate in opposite directions, this manner of passing the strand wire around the same will dispose it at the descending side of each drum and the various operating gears and cams for the barb forming and applying devices will be accordingly set, so that the barbs will be formed, applied and severed during the descent of the mechanism from the upper to the lower side of its drum.

The crimping rolls $a^2$ and $a^3$ are preferably geared together, as shown, and a rotary distributer $a^6$ is disposed in advance of the reel to cause the proper winding of the completed wire thereon. It will also appear that as both drums apply barbs to the same strand it is necessary to provide for the disposal of these barbs at different points. This is accomplished by effecting an alternating arrangement of the groups of devices associated with the respective drums.

By reason of the provision of the crimping rolls, which of course present more or less resistance to the advance of the wire, the latter may be placed under sufficient tension by the rotation of the reel to effect the rotation of the drums without the necessity for employing separate drum operating mechanism, attention being directed to the fact that the barbs in process of formation will be wound tightly on the strand wire, thus preventing the latter from slipping through the twisters, and effecting an operative connection between the strand wire and the drums. While the frictional connection between the barbs and the wire $a'$ will probably be sufficient to prevent slipping of the wire, the crimping of the latter presents a material resistance to such relative movement of the wire and barbs as would result in the defective operation of the mechanism. Obviously, however, if desired, the drums may be operated by the application of power in a manner similar to that described in connection with the first form of the invention.

In construing the claims, the term "barbed wire" is to be understood as applying to a wire whether composed of a single strand or a plurality of strands, regardless of whether single or double barbs are applied to the single strand wire or to one or more strands of a plural strand wire.

The foregoing description of the illustrated embodiments of the invention is thought to be sufficiently explicit for the purpose of this disclosure; but I desire to be distinctly understood as reserving the right to effect such changes, modifications, and variations of the illustrated structures as may come fairly within the scope of the appended claims.

What I claim is:—

1. In a wire barbing machine, the combination with a stationary shaft, of a rotary drum comprising a pair of spaced heads each journaled on the shaft and a series of separate supports forming the periphery of the drum and each extending between and serving to connect the outer edges of the heads, and several groups of mechanism exposed upon the periphery of the drum, each group being carried by one of the supports and including means for guiding a strand wire, means for feeding a barb-forming wire across the strand wire, means for twisting the barb-forming wire around the strand wire, and means for severing the barb from the barb-forming wire after the barb has been affixed to the strand wire.

2. In a wire barbing machine, the combination with a stationary support, a rotary drum mounted on and revolving around the same and means for rotating the drum, of several groups of barb forming, applying, and cutting mechanisms mounted on the drum, and means housed within the drum for effecting the operation of said groups of mechanisms in proper order as the drum rotates.

3. In a wire barbing machine, the combination with a rotary drum, and means for rotating the same, of several groups of barb feeding, applying, and cutting mechanisms distributed about the periphery of the drum, and stationary operating mechanism located in the drum to operate the several groups of mechanisms as the drum rotates.

4. In a wire barbing machine, the combination with a stationary shaft, of a drum rotatable thereon and comprising heads and an intermediate series of removable supporting blocks, and barb forming and applying mechanism carried by each block.

5. In a wire barbing machine, the combination with a stationary shaft, of a rotary drum thereon, comprising a pair of spaced heads and intermediate supports, barbing mechanism mounted on the supports and including a series of twisters, and twister operating mechanism including a series of short shafts extended from one of the heads of the drum, planet gears mounted on said shafts and geared to the twisters, and a mutilated sun gear fixed to the stationary drum supporting shaft between the heads of the drum and disposed to mesh with the planet gears.

6. In a wire barbing machine, the combination with a rotary drum, of a series of strand wire guides distributed around the drum, twisters journaled in the guides, fixed center guides each extending entirely through a twister at the axis thereof to receive the strand wire and retain the same out of contact with any part of the rotating twister, and means associated with each twister for feeding the end of a barb forming wire thereto and for severing a barb from said wire after the same has been applied to the strand.

7. In a wire barbing machine, the combination with a stationary support, of a rotary drum comprising a pair of heads, a series of supporting blocks extending between the heads, a slotted guide lug extending outwardly from each block adjacent to one of the heads, twisters journaled in said lugs, and mechanism associated with the twisters for feeding and cutting barb-forming wires.

8. In a wire barbing machine, the combination with a drum, including a series of supporting blocks, of slotted guide lugs extending outwardly from each block, a rotary twister journaled in each of said lugs, a center guide rigidly secured to each block and extending entirely through a twister at the axis thereof, and wire feeding and cutting means also mounted on each block in coöperative relation to the twister to feed and cut a barb forming wire.

9. In a wire barbing machine, the combination with a rotary drum equipped with a circumferential series of strand wire guides extending from the periphery thereof, rotary twisters mounted in said guides, a pair of feed rolls mounted on the periphery of the drum and operated by the movement thereof to feed a barb forming wire to each twister, and wire guiding and cutting means also carried by the drum at the periphery thereof and located intermediate of each twister and the adjacent feed rolls.

10. In a wire barbing machine, the combination with a rotary drum, of a series of twisters carried thereby, a pair of feed rolls associated with each twister to feed a barb forming wire thereto, a star wheel associated with and controlling the movement of each pair of feed rolls, and means disposed to engage and operate the star wheels during the movement of the drum.

11. In a wire barbing machine, the combination with a rotary drum, a series of twisters carried thereby, and a pair of feed rolls associated with each twister, of a star wheel operatively connected to each pair of rolls, a locking cam associated with each star wheel, and a fixed member coöperating with the locking cams and provided with pins coöperating with the star wheels.

12. In a wire barbing machine, the combination with a rotary drum, a series of twisters mounted thereon, and a pair of feed rolls associated with each twister, of a star wheel operatively related to each pair of rolls, an angular locking cam associated with each star wheel, and an annular fixed member provided with a flat face coöperating with the locking cams and also provided with pins coöperating with the star wheels, and with a notch affording clearance for the locking cams to permit the rotation of the star wheels at the proper time.

13. In a wire barbing machine, the combination with a rotary drum, a series of twisters movable therewith, and a pair of feed rolls associated with each twister and geared together, of a shaft extending inwardly from one feed roll of each pair and equipped with a star wheel and a locking cam, and stationary means housed within the drum and coöperating with the several star wheels and cams as the drum rotates.

14. In a wire barbing machine, the combination with a rotary drum including a series of supporting blocks and a group of barbing mechanism carried by each block and including a twister, of a pair of feed rolls geared together, shafts extending inwardly from the feed rolls, an adjustable bearing block receiving one of the shafts to permit relative adjustment of the rolls, and a star wheel and locking cam carried by the other shaft at its inner end.

15. In a wire barbing machine, the combination with a drum including a supporting block, a slidably mounted bearing block located therein, and means for adjusting the bearing block, of a pair of feed rolls geared together and provided with shafts one of which is received by and laterally adjustable with the bearing block.

16. In a wire barbing machine, the combination with a support, of barbing mechanism mounted thereon and including feeding means, twisting means, and an intermediate cutter, said cutter being movable to sever the barb forming wire and adjustable to vary the length of the barb point.

17. In a wire barbing machine, the combination with a support, of barbing mechanism mounted thereon and including feeding and twisting means and an intermediate rotary and endwise movable cutter bar.

18. In a wire barbing machine, the combination with a support, of barbing mechanism mounted thereon and including wire feeding and twisting means, an intermediate adjustable wire guide, and a cutter adjustable with the guide and movable to sever the barb forming wire.

19. In a wire barbing machine, the combination with a support, of wire feeding and twisting mechanism, an intermediate laterally adjustable wire guide, and a rotary and endwise movable cutter bar coöperating with the guide.

20. In a wire barbing machine, the combination with a support, of wire feeding and twisting mechanism mounted thereon, an intermediate adjustable wire guide having an angular end face, and a rotary and endwise movable cutter having a flat face engaging the angular end face of the guide whereby the adjustment of the guide will rotate the cutter to effect a corresponding adjustment thereof.

21. In a wire barbing machine, the combination with a support provided with a recess in one face, of a non-rotary tappet mounted to reciprocate within the recess, and a cutter bar screwed into the tappet and extended beyond the opposite face of the support, the recited arrangement permitting the displacement and replacement of the cutter bar without disturbing the tappet.

22. In a wire barbing machine, the combination with a support provided with an angular recess extending inwardly from one face thereof, a tappet mounted to reciprocate in the recess and having an end extended therefrom, a cutter bar screwed into the tappet and extended through the support, a spring encircling the cutter bar and having its ends opposed to the support and tappet respectively, means preventing the withdrawal of the tappet from the recess, and means coöperating with the tappet to operate the cutter bar.

23. In a wire barbing machine, the combination with a rotary drum, of several groups of barbing mechanism carried by the drum and each including a spring retracted, radially disposed, reciprocatory cutter bar provided at its inner end with a tappet, and a fixed cutter operating cam mounted in the drum and arranged to operate the cutters in succession.

24. In a wire barbing machine, the combination with a stationary shaft, of a rotary drum including a pair of heads each journaled on the shaft, a series of supporting blocks forming the periphery of the drum and connecting the heads, several groups of barbing mechanism exposed upon the periphery of the drum, each group being supported by one of the blocks and including a strand wire guide, means for feeding a barb forming wire across the strand wire, means for twisting the barb forming wire around the strand wire and a cutter for severing the barb from the barb forming wire, means housed within the drum for operating the feeding, twisting and cutting means, and a series of spools carried by one head of the drum, each of said spools being arranged opposite one of the supporting blocks and adapted to supply a barb forming wire to the group of barbing mechanism mounted on said block.

25. In a wire barbing machine, the combination with a stationary shaft and a drum rotatable thereon, of a series of strand wire guides distributed around the drum, twisters associated with the guides and movable with the drum, and means mounted on the drum for feeding a plurality of barb forming wires in opposite directions to each twister.

26. In a wire barbing machine, the combination with a rotary drum, of a series of spools supported by the drum at each side thereof for the barb forming wires, a series of strand wire guides distributed around the drum, a twister associated with each of said guides, two pairs of feed rolls associated with each twister to guide a pair of barb forming wires thereto from spools located at opposite sides of the drum, and means for guiding and cutting each of said wires.

27. In a wire barbing machine, the combination with a pair of rotary barbing drums coacting in the formation of barbed wire, of several groups of barbing mechanism mounted on each drum, the groups on the respective drums having alternating arrangement.

28. In a wire barbing machine, the combination with a pair of rotary supports, of barbing mechanism mounted on said supports and coöperating in the production of barbed wire.

29. In a wire barbing machine, the combination with a support, of a pair of wire barbing drums geared together for movement in unison and each equipped with an annular series of wire barbing groups, the groups of each drum having alternating arrangement with the groups of the other drum and coacting therewith in the production of a barbed wire.

30. In a wire barbing machine, the combination with a support, of a pair of stationary shafts, rotary wire barbing drums mounted on said shafts and geared together, barbing mechanism carried by each drum and arranged in duplicate groups, the groups of each drum being arranged in alternation with the groups of the other drum and coacting therewith in the production of a barbed wire, and means inclosed by each drum for operating the several groups of barbing mechanism mounted thereon.

31. In a wire barbing machine, the combination with a support, of a pair of stationary shafts, a rotary barbing drum mounted on each shaft and supporting equidistant groups of barbing mechanism coacting with the barbing mechanism on the other drum in the production of barbed wire, and spools for the barb forming wires, gear wheels fixed to the drums and intermeshing to cause the drums to rotate in unison and in opposite directions, and fixed elements mounted on the stationary shafts and within the drums to effect the operation of the barb forming mechanism as the drums rotate.

32. In a wire barbing machine, the combination with a stationary shaft, of a rotary drum including a pair of spaced heads each journaled on the stationary shaft, a series of groups of barbing mechanism exposed upon the periphery of the drum intermediate of the heads thereof, each group including wire feeding mechanism, wire twisting mechanism, wire cutting mechanism, and stationary operating devices fixed upon the stationary shaft between the heads of the drum and arranged to operate the feeding, twisting and cutting mechanism of the several groups in the proper order.

33. In a wire barbing machine, the combination with a stationary shaft, of a drum rotatable thereon and including two heads spaced apart and each journaled on the shaft and a series of removable blocks surrounding the shaft but spaced from the latter and connecting the heads of the drum, barb forming and applying mechanism carried by each of the removable blocks, and means mounted on the stationary shaft between the heads and surrounded by the blocks and arranged to operate the barb forming and applying mechanism mounted on the latter.

34. In a wire barbing machine, the combination with a stationary shaft, of a hollow drum journaled on the shaft to rotate independently thereof, a pair of feed rolls and a twister exposed upon the periphery of the drum, a shaft extended to the interior of the drum from one of the exteriorly arranged feed rolls, means coöperating with the inner end of said shaft to rotate the same, a cutter bar having one end exposed upon the exterior of the drum between the feed rolls and the twister and having a tappet at its opposite end located upon the interior of the feed drum, and means housed within the drum and coöperating with the tappet to operate the cutter bar as the drum rotates.

35. In a wire barbing machine, the combination with a stationary shaft, of a hollow drum mounted to rotate thereon, a pair of feed rolls and a twister exposed upon the periphery of the drum, one of said feed rolls having a shaft disposed radially with respect to the drum and extended to the interior thereof, a cutter bar disposed radially with respect to the drum and having a tappet at its inner end, and stationary operating means fixed to the stationary shaft and located upon the interior of the drum to coöperate with the inner end of the shaft of the feed roll and with the tappet at the inner end of the cutter bar.

36. In a wire barbing machine, the combination with a stationary shaft, of a hollow rotary drum mounted thereon and comprising a pair of heads spaced apart but having their outer edges connected, barbing mechanism exposed upon the periphery of the drum and including a series of twisters, and twister operating mechanism including planet gears supported from one of the heads of the drum, and a mutilated gear housed within the hollow drum and fixed to the stationary shaft to operate the planet gears as the drum rotates.

37. In a wire barbing machine, the combination with a stationary shaft, of a hollow rotary drum mounted thereon and comprising a pair of spaced heads and a plurality of removable supporting blocks spaced from the fixed shaft and connecting the heads, a group of barbing mechanism carried by each of the supporting blocks and including feed rolls, a twister, and a cutter, means carried by one of the heads of the drum for supplying barb forming wires to the several groups of barbing mechanism, a series of planet gears supported from the other drum head and geared to the twisters, and a fixed gear mounted within the drum upon the stationary shaft to effect the rotation of the planet gears as the drum revolves.

38. In a wire barbing machine, the combination with a stationary shaft, of a hollow drum mounted to rotate thereon and comprising a pair of spaced heads and intermediate supporting blocks, a group of barbing mechanism mounted on each block and including a pair of feed rolls, a twister, and a cutter located between the feed rolls and twister, stationary operating means housed within the drum and fixed to the stationary shaft to effect the operation of the feed rolls and cutters at the proper times, a series of spools carried by one of the drum heads and adapted to supply barb forming wires to the several groups of barbing mechanism, a series of short shafts carried by the other head, planet gears mounted on said short shafts and geared to the twisters, and a mutilated sun gear fixed to the stationary shaft at a point within the drum and arranged to be engaged by the planet gears as the drum rotates.

39. In a wire barbing machine, the combination with a stationary shaft, of a hollow rotary drum mounted on the shaft and comprising a pair of heads and a series of supporting blocks extending between the heads, a slotted guide lug extending outwardly from each block adjacent to one of the drum heads, twisters journaled in said lugs, gearing mounted on the adjacent drum head to operate the twisters, and means housed within the drum to operate the gearing as the drum rotates.

40. In a wire barbing machine, the combination with a hollow drum including a supporting block, of barbing mechanism mounted on the block and including a pair of rolls and a twister, a bearing block adjustably mounted in the supporting block, a shaft carrying one of the feed rolls and extended through the bearing block, means for shifting the bearing block in the supporting block to adjust said shaft laterally, a second shaft extending through the supporting block from the other feed roll, and means mounted within the drum for rotating the last named shaft as the drum revolves.

41. In a wire barbing machine, the combination with a support, of a cutter movable to sever the barb forming wire, said cutter being movable in another direction to change the angle of its cutting edge with respect to the wire for the purpose of regulating the length of the barb point.

42. In a wire barbing machine, the combination with a stationary shaft, of a hollow drum mounted thereon and including a pair of heads and an intermediate support, wire feeding and twisting mechanism mounted on the support, a cutter bar extended through the support and having a cutting edge at its outer end exposed upon the exterior of the drum, and a cutter operating cam carried by the stationary shaft and housed within the drum to coöperate with the inner end of the cutter bar.

43. In a wire barbing machine, the combination with a rotary drum, of two series of spools supported by the drum to supply the barb forming wires, means for guiding a strand wire around a portion of the drum, a series of twisters distributed around the periphery of the drum, and two feeding mechanisms associated with each twister to feed a pair of barb forming wires thereto from corresponding spools of each series, means operated by the movement of the drum to cause each twister to simultaneously wrap the ends of a pair of barb forming wires around the strand wire, and means for severing the barbs from the barb forming wires.

44. In a wire barbing machine, the combination with a rotary drum, of a series of spools supported by the drum at each side thereof and carrying the barb-forming wires, strand wire guiding means extending around the drum, a series of twisters associated with said guiding means, two pairs of feed rolls associated with each twister to guide a pair of barb-forming wires thereto from spools located at opposite sides of the drum, and means for cutting the barb-forming wires.

45. In combination, a pair of rotary barbing drums coacting in the formation of barbed wire, said drums including rotary supports and barb forming mechanism mounted thereon.

46. In a wire barbing machine, in combination, a pair of rotary barbing drums coacting in the formation of barbed wire, each of said drums including a rotary support and several groups of barbing mechanism mounted thereon.

47. In a wire barbing machine, in combination, a pair of wire barbing drums coacting in the production of barbed wire, each equipped with an annular series of wire barbing groups, and each group including means for feeding, twisting and severing a barb forming wire.

48. In a wire barbing machine and in combination, a pair of wire barbing drums coöperatively related and each including a rotary support equipped with an annular series of barbing groups coacting with the barbing groups of the other drum in the production of barbed wire, each group including a spool for the support of the barb forming wire and a feeder, twister and cutter for said wire.

49. In combination with two rotary supports arranged in juxtaposition, a series of twisters mounted on each support and alternating with the twisters on the other support the twisters on the respective supports coacting in the production of barbed wire.

50. In combination a pair of rotary supports geared together, a series of twisters mounted on each support and coacting with the twisters on the other support in the production of barbed wire, and twister operating mechanism.

51. In a wire barbing machine and in combination, two series of twisters coöperating in the production of barbed wire, each series of twisters moving in an endless orbit different from the orbit of the other series.

52. In combination, two series of twisters coöperating in the production of barbed wire, means for causing said series of twisters to travel in different directions, means for feeding barb forming wires to the twisters, and wire cutting means.

In testimony, that I claim the foregoing as my own, I have hereto affixed my signature in the presence of two witnesses.

ALVA L. KITSELMAN.

Witnesses:
JOHN H. SIGGERS,
FLORENCE WALTER.